United States Patent
Hakansson et al.

(10) Patent No.: US 7,464,962 B2
(45) Date of Patent: Dec. 16, 2008

(54) SAFETY DEVICE FOR A TRUCK CABIN AND CABIN FOR A TRUCK

(75) Inventors: Anders Hakansson, Klippan (SE); Yngve Háland, Falsterbo (SE); Erik Hjerpe, Torslanda (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/777,723

(22) Filed: Jul. 13, 2007

(65) Prior Publication Data

US 2008/0048424 A1 Feb. 28, 2008

(51) Int. Cl.
*B60R 21/06* (2006.01)
(52) U.S. Cl. .................................................. 280/749
(58) Field of Classification Search ................. 280/749, 280/748; 296/190.02, 190.03; 297/184.1, 297/184.11
See application file for complete search history.

(56) References Cited

U.S. PATENT DOCUMENTS

| | | | | |
|---|---|---|---|---|
| 3,650,542 A | * | 3/1972 | Shimano et al. | 280/749 |
| 3,692,327 A | * | 9/1972 | Barrick et al. | 280/749 |
| 4,278,273 A | * | 7/1981 | Schiff | 280/802 |
| 5,226,672 A | * | 7/1993 | Husted | 280/749 |
| 5,625,980 A | * | 5/1997 | Teich et al. | 49/26 |
| 5,707,075 A | * | 1/1998 | Kraft et al. | 280/730.2 |
| 6,135,497 A | * | 10/2000 | Sutherland et al. | 280/749 |
| 6,672,619 B1 | * | 1/2004 | Ennerdal et al. | 280/749 |
| 7,077,430 B2 | * | 7/2006 | Johansson et al. | 280/748 |
| 7,303,209 B2 | * | 12/2007 | Kwok | 280/749 |
| 2004/0012183 A1 | * | 1/2004 | Jessup et al. | 280/748 |
| 2004/0212217 A1 | * | 10/2004 | Cacucci et al. | 296/152 |
| 2007/0018442 A1 | * | 1/2007 | Kwok | 280/749 |
| 2007/0152436 A1 | * | 7/2007 | Kwok | 280/749 |

FOREIGN PATENT DOCUMENTS

GB 2 351 711 A 1/2001

* cited by examiner

*Primary Examiner*—John Q. Nguyen
*Assistant Examiner*—Joseph Rocca
(74) *Attorney, Agent, or Firm*—Brinks Hofer Gilson & Lione

(57) ABSTRACT

A novel safety device for the driver's cabin of a truck, wherein the driver's cabin demonstrates at least one driver seat (10, 16) with a first side (10a) facing a side window and a second side (10b) opposite the first side, is suggested. The safety device comprises a safety net (20), which is spread next to the second side (10b) of the driver seat (10) at least in the event of a rollover accident. The safety net can be permanently spread next to the driver seat, or it can be rolled up or folded together in the state of rest and only be spread next to the driver seat when needed. The safety net prevents the person sitting on the driver seat from falling to the opposite inner structure of the driver's cabin when the driver's cabin rolls over (FIG. 10).

14 Claims, 6 Drawing Sheets

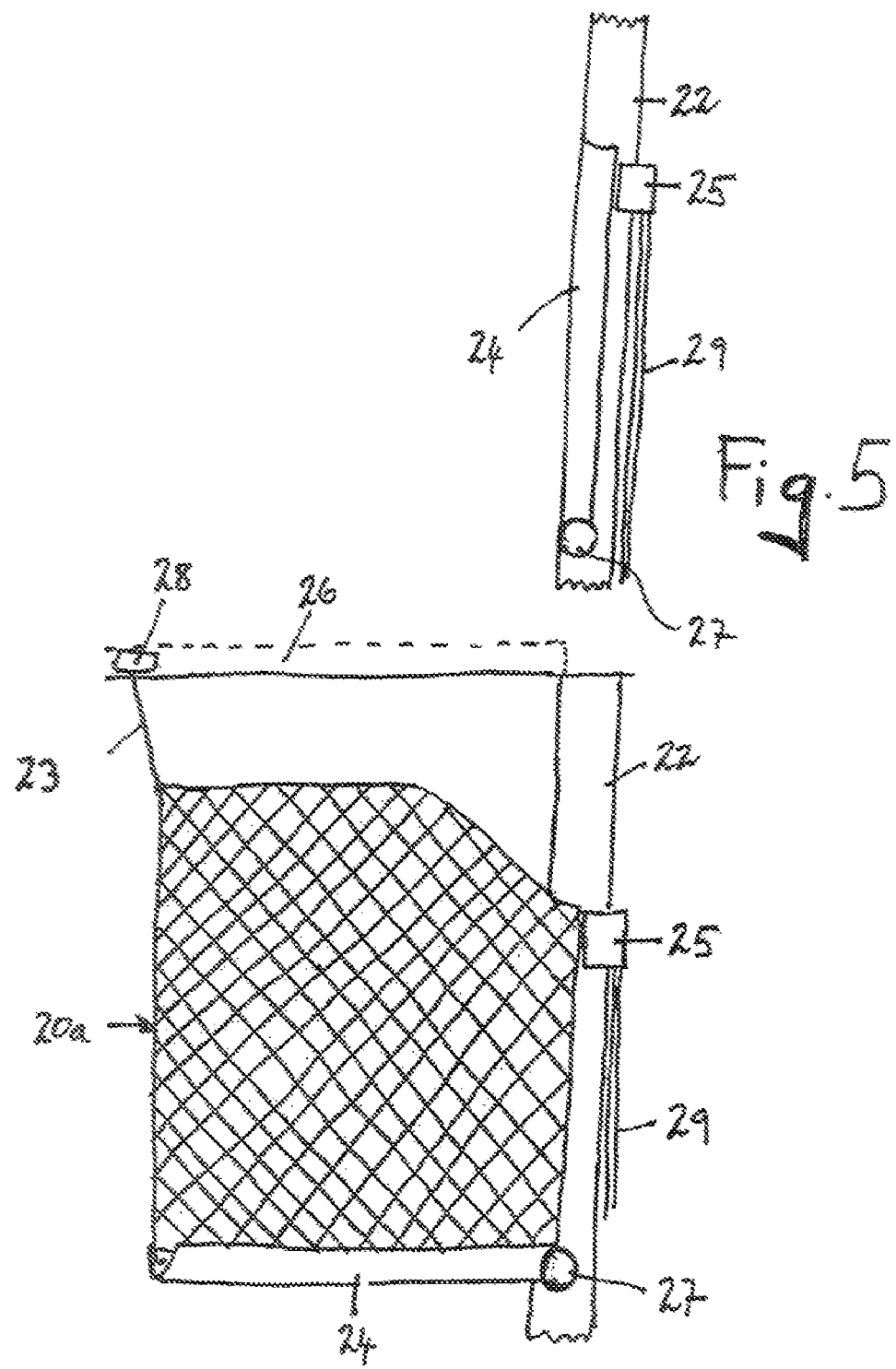

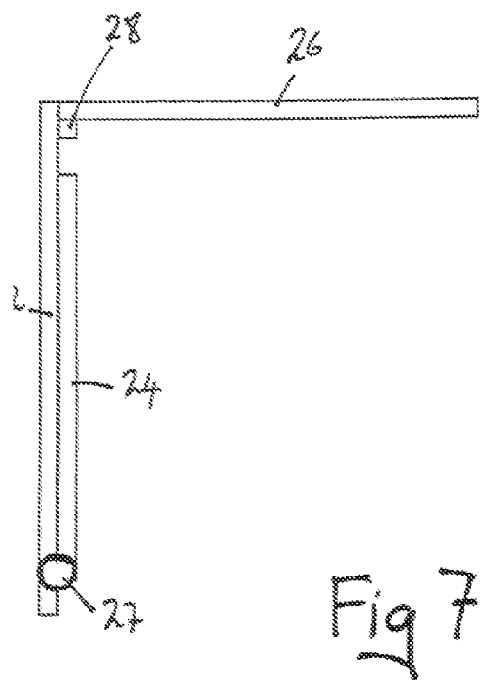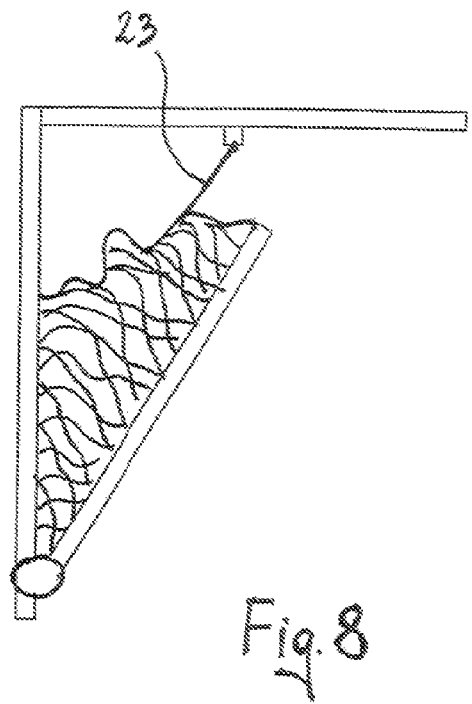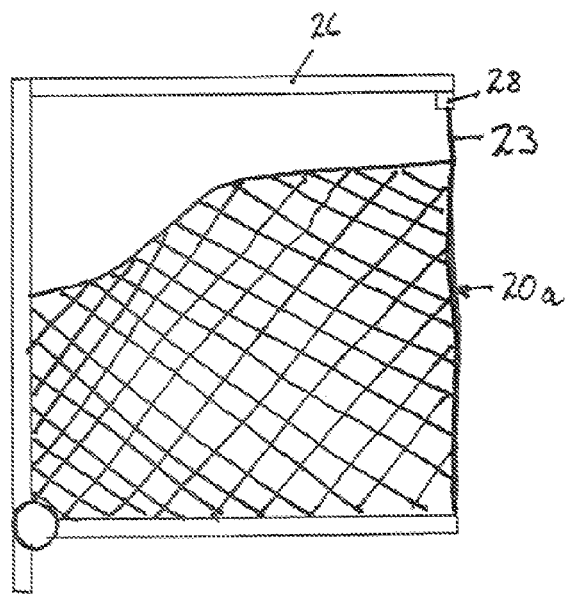

US 7,464,962 B2

SAFETY DEVICE FOR A TRUCK CABIN AND CABIN FOR A TRUCK

FIELD OF THE INVENTION

The invention relates to a safety device for a vehicle cabin.

BACKGROUND OF THE INVENTION

A safety device for a driver's cabin of a vehicle, such as for example a truck, is intended to improve the protection of a driver in the event of an accident is disclosed in patent GB 2 351 711 A. The safety device comprises a safety net, which is pulled in front of the side window of the driver's door to prevent the driver being thrown from the cabin when the side window is open. Without such a safety device, this can happen in particular when the driver is not seatbelted.

SUMMARY OF THE INVENTION

Proceeding herefrom, it is the object of the present invention to create another safety device for the driver's cabin of a truck that will help further improve the safety of the driver and possibly the passenger.

When the driver's cabin tips over, the driver may not only be at risk of being thrown out the open side window, but also of being thrown in the opposite direction, namely into the interior of the driver's cabin. The driver may then, for example, strike the inner structure of the passenger door, where a relatively long distance of fall can appear because of the large width of a driver's cabin.

In at least one embodiment of the present invention, a safety net may be provided on the side of the vehicle seat, such as a driver's seat, opposite the side window. Such a safety net may catch the driver at an early point in time, before he/she has transpassed a large height of fall, thereby diminishing the risk of injury. Such a safety net may also prevent the driver from striking any passenger who might be present.

As long as the safety net is sufficiently transparent, it is possible to permanently dispose the safety net next to the driver. But in many cases, optimum protection can be achieved only if the safety net essentially extends across the entire cross-section of the driver's cabin and thus divides the driver's cabin in the longitudinal direction. In general, drivers will presumably not accept such a nearly complete division of the driver's cabin.

In a first preferred embodiment, the safety net is at rest in the folded state and is unfolded into its protective position only upon a sensor signal. The corresponding sensor can, in particular, be an inclination sensor that measures lateral inclination of the driver's cabin.

In a second preferred embodiment, the safety net has a triangular shape and runs from a maximum width, which is located essentially at the height of the driver seat, to a top end, which is preferably located above the head of the driver.

The safety net is preferably held by a rod which runs essentially vertically, the vertically running rod furthermore preferably being rigidly connected to the cabin floor and the cabin ceiling. This type of fastening may have numerous advantages: In the first place, a rod running vertically in this manner can be easily positioned so that it provides ideal protection for the driver. Furthermore, a rod running vertically in this manner can be subsequently built into an already existing cabin, the system thus also being suitable for retrofitting. Finally, such a vertically running rod can also carry other devices, such as steps or a display screen.

BRIEF DESCRIPTION OF THE DRAWINGS

FIG. 5 is the safety device depicted in FIGS. 2 through 4 in the state of rest;

FIG. 6 is the safety device depicted in FIG. 5 in the activated state;

FIGS. 7-9 are schematic illustrations of the unfolding process of the safety net depicted in FIGS. 2 through 6;

DETAILED DESCRIPTION OF THE INVENTION

Figure 1:
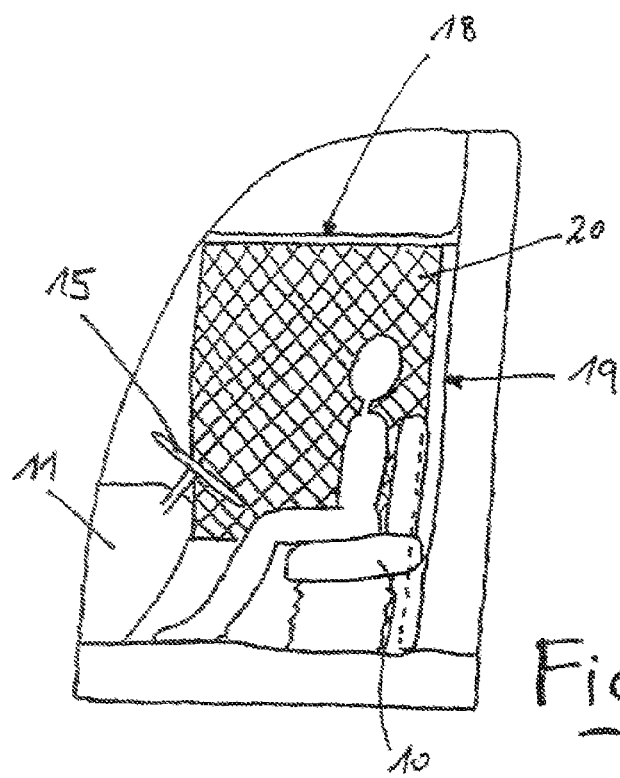
FIG. 1 is a longitudinal section through a driver's cabin in a first embodiment of the invention.
Figure 2:
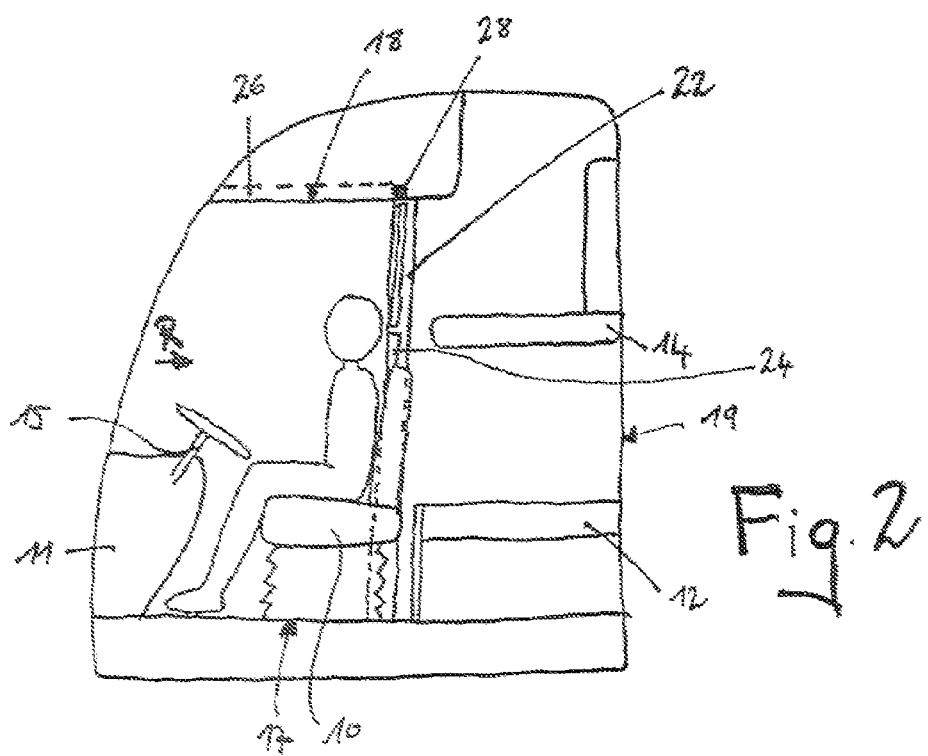
FIG. 2 is a longitudinal section through a driver's cabin in a second embodiment of the invention in the state of rest.
Figure 4:
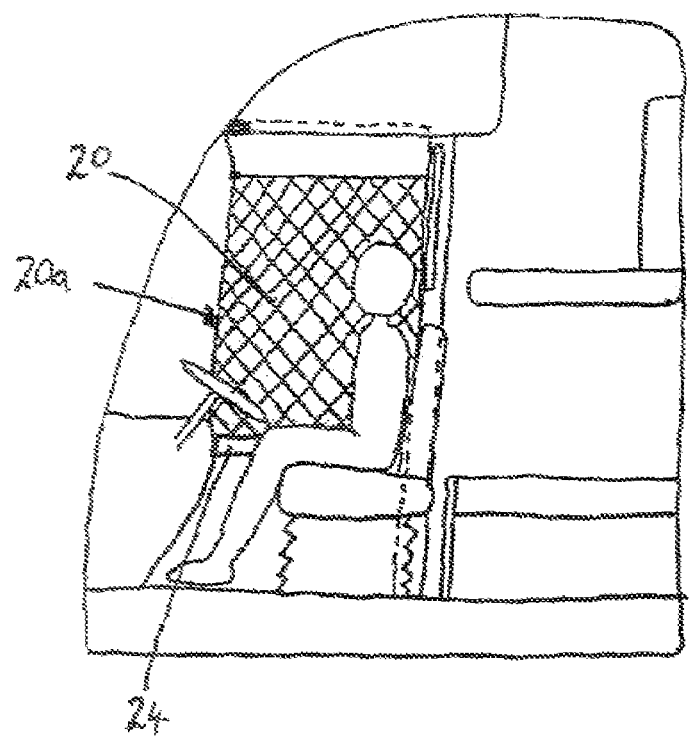
FIG. 4 is the depiction shown in FIG. 2 with the safety device activated.
Figure 3:
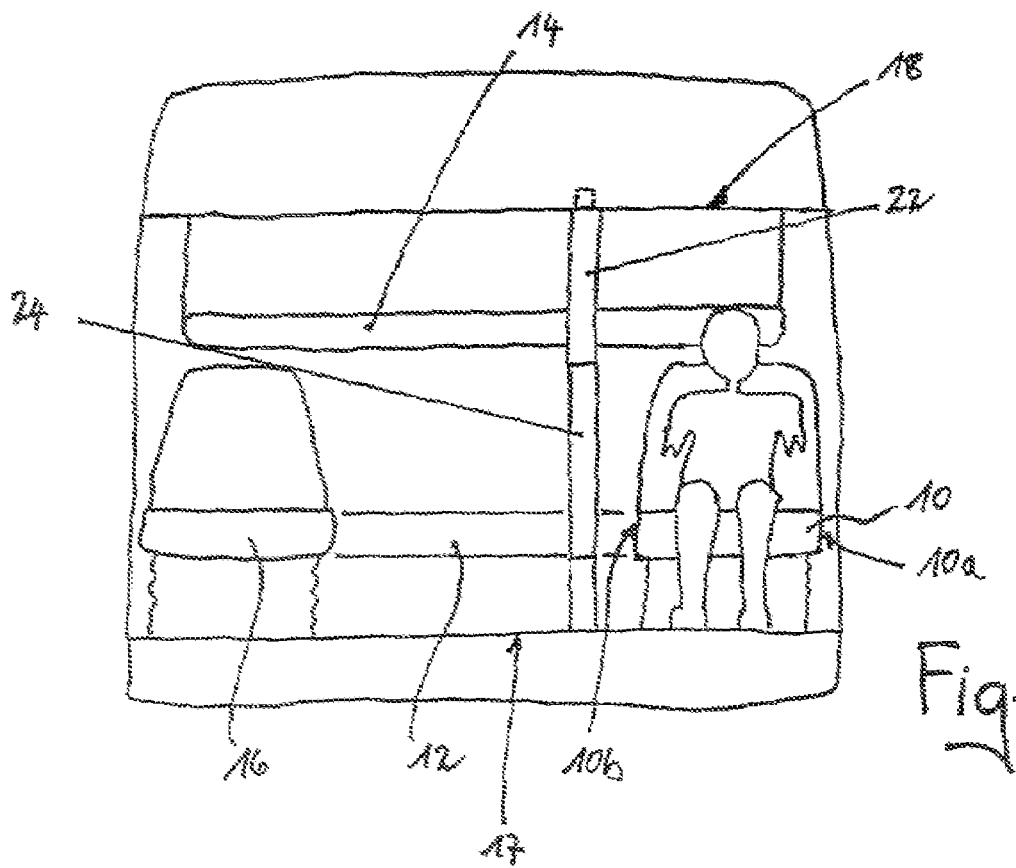
FIG. 3 is the depiction shown in FIG. 2 viewed from the direction R.

FIG. 1 schematically shows the driver's cabin of a truck as seen from the driver door. The driver's cabin depicted here demonstrates a driver seat 10 located directly in front of the back wall 19 of the cabin, an instrument panel 11 and a steering wheel 15. A safety net 20, which extends from the cabin ceiling 18 to approximately the height of the seat surface of the driver's seat 10, is located on the side of the driver's seat 10 pointing in the direction of the interior of the driver's cabin (herein called the second side). Here the safety net is embodied as a net made out of a plurality of strings knotted or weaved together, its mesh size being so large that the safety net 20 is sufficiently transparent so that the driver can adequately see outside the right rearview mirror through the safety net 20. In this embodiment, the safety net 20 is permanently mounted in the position depicted in FIG. 1. Here the safety net can be fastened on the cabin ceiling 18, on the rear wall 19 of the cabin and on the instrument panel 11. This embodiment is very inexpensive and nevertheless offers a high degree of additional safety for the driver. If the truck tips onto the passenger side, the net will catch the driver and prevent him/her from falling through the driver's cabin. The disadvantage of this embodiment, however, is that the driver can have a certain feeling of "imprisonment." A safety net having this geometry is also effective if the driver is unseatbelted.

FIGS. 2 to 9 depict an embodiment that offers a similar degree of safety as the first embodiment but which the driver may deem as less constraining. The second embodiment of the invention is shown on the basis of a driver's cabin as often found in semitrailer trucks in particular. Here two bunks 12, 14 are disposed behind the driver's seat and passenger seat. The rear wall 19 of the cabin may not be available for fastening the safety net 20. A vertically running rod 22, which carries the safety net 20, is therefore provided.

FIGS. 2, 3, 5 and 7 depict the safety device in its state of rest. In this state of rest, there is no unfolded safety net 20 located on the second side of the driver's seat 10. In the state of rest, one arm 24 extends parallel to the vertically running rod 22 upon which it is locked by a locking device 25. A pivot joint 27 disposed in a lower region of the rod 22 serves for the connection between arm 24 and rod 22. Signal lines 29 connect the locking device 25 to the body electronics or to a separate inclination sensor (not illustrated). This inclination sensor can, for example, be embodied as an inclination sensor like those currently used for the blocking devices of belt retractors. If the lateral inclination of the driver's cabin exceeds a predefined critical angle and/or a predefined acceleration limit is exceeded, then a signal is sent to the locking device 25, which thereupon unlocks the arm 24. The arm 24 then swings into its horizontal position due to gravitational force. Locking means that lock the arm in this final position can be provided. The arm 24 could also be prestressed against the rod 22 by a spring (not illustrated) so that the arm 24 will more rapidly swing into the horizontal position depicted in FIGS. 4, 6 and 9 after the locking is released. Excessive acceleration is preferably avoided so as to minimize the associated risk of injury, and is also not necessary, because there is usually a relatively large amount of time available to unfold the safety net 20 after a tipping movement has been detected.

A guide rail 26 comprising a slide element 28 is disposed on the cabin ceiling 18. In the state of rest (see FIGS. 2 and 7 in particular), the slide element 28 is essentially disposed directly above the vertically running rod 22, which is tightly connected to the cabin floor 17 and cabin ceiling 18. In this state, the safety net is folded together. If the locking device 25 is now raised, then the arm 24 swings (see FIG. 8 in particular) into its horizontal position, wherein the front top corner of the safety net 20 is held in position. A pull string 23, which connects the front top corner of the safety net 20 to the slide element 28, serves this purpose. During the unfolding, the safety net 20 pulls the slide element 28 into its final forward position depicted in FIGS. 6 and 9. The front edge 20a of the safety net is stiff so that the unfolded safety net 20 features high stability. As an alternative to the slide element, the front top corner of the safety net or of the pull thread 23 that is fastened here can also be directly connected to the cabin roof. In this case, the safety net 20 cannot be completely folded together on the rod 22.

In the unfolded state of protection, the safety net 20 essentially covers the same cross section as the safety net of the first embodiment so that the protective effect is similar. Since essentially the entire cross section of the driver's cabin is covered in this case, an unseatbelted driver is also well protected in these two embodiments.

In the second embodiment illustrated in FIGS. 2 to 9, a sensor unit which checks, at least prior to the release of the locking, whether an object (and as the driver's arm or leg) is located in the plane of motion of the arm 24, is preferably present. If such an object is sensed, then the locking is preferably not released. Such a sensor unit can comprise a photoelectric barrier for example.

Figure 10:
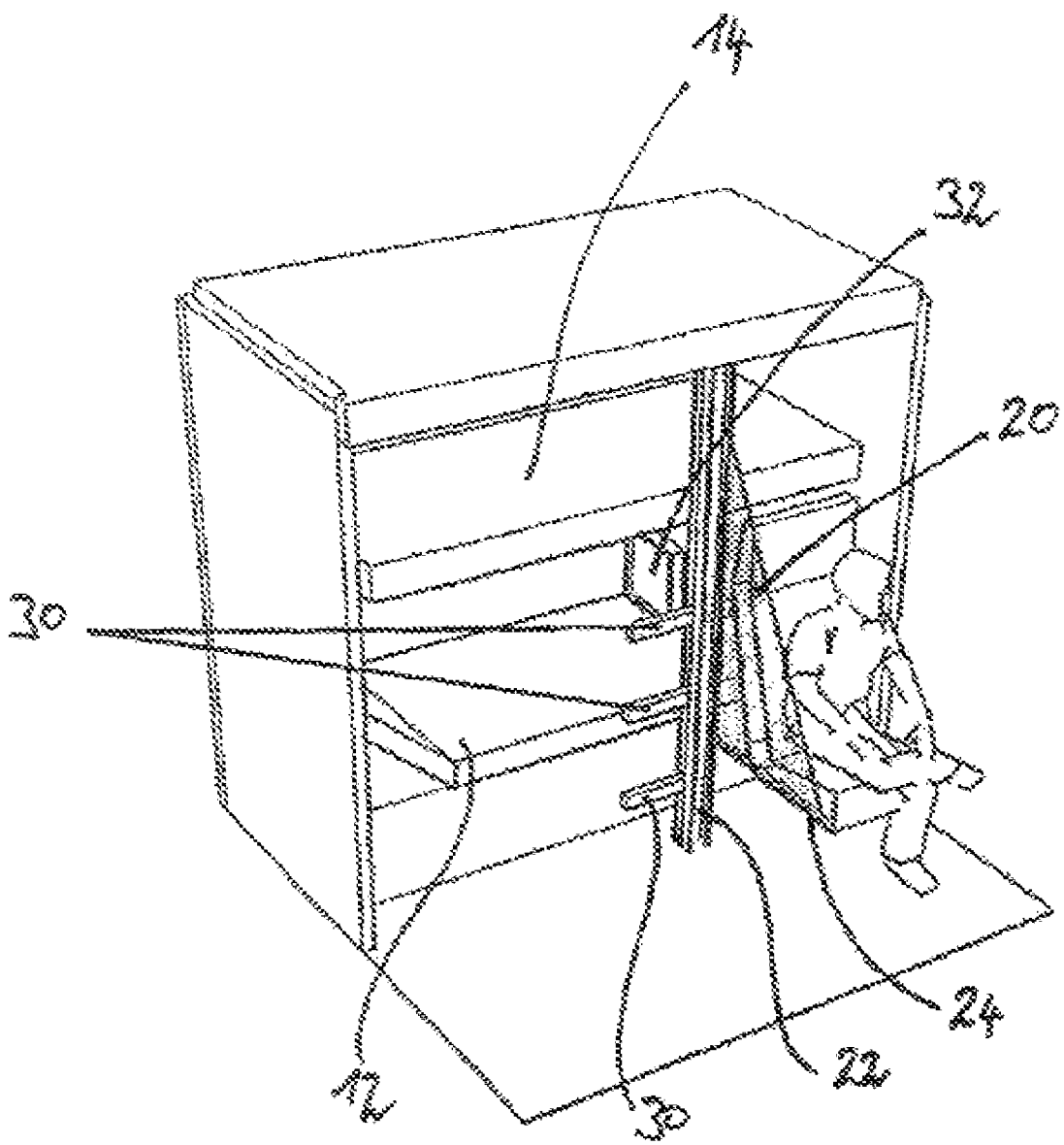
FIG. 10 is a perspective illustration of a driver's cabin of a truck having a safety device according to a third embodiment.

FIG. 10 depicts a third embodiment of the invention. This embodiment will also be explained on the basis of a driver's cabin that comprises two bunks 12, 14 and is suitable for long-distance drives. Here too, the safety net 20 is fastened to a vertically running rod 22 comprising an arm 24. The arm 24 is permanently in a horizontal position, however, at least during the drive. In order to provide the driver full access to the cabin during his/her breaks, the arm can may be disposed on the vertically running rod so that it swings around a pivot joint so that the arm can be swung into a vertical position manually. It should nevertheless be ensured that the arm is locked in the position illustrated in FIG. 10 when the engine is running. This can be accomplished, for example, through the presence of a switch which will interrupt the engine ignition if the arm is not locked in its horizontal position.

In one example, the safety net 20 may have a triangular shape with the hypotenuse extending diagonally from the end of the arm 24 to the vertically running rod 22. The dimension of the safety net is chosen in such a manner that it does not impair sight of the driver to the right outside rearview mirror. A confined feeling for the driver, as can occur in the first embodiment, therefore does not arise. In this embodiment, less cross section than in the first two embodiments of the driver's cabin is covered but it still does result in significantly improved safety compared to the prior art.

FIG. 10 illustrates that the vertically running rod 22 can still be used as carrier for other devices, such as steps 30 and a display screen 32.

In the second and third embodiment presented here, transparency of the safety net is dispensable. Here it therefore does not have to be embodied as a knotted net, but can also be embodied as a cloth run or the like. Knotted nets are nevertheless preferred because of the good ratio between weight and load-bearing capacity.

It is to be understood that a safety device described here can also be assigned to the passenger seat 16 (see FIG. 3), namely every vehicle seat. In particular, it is also possible to assign a safety net both to the driver's seat and to the passenger seat.

Figure 11:
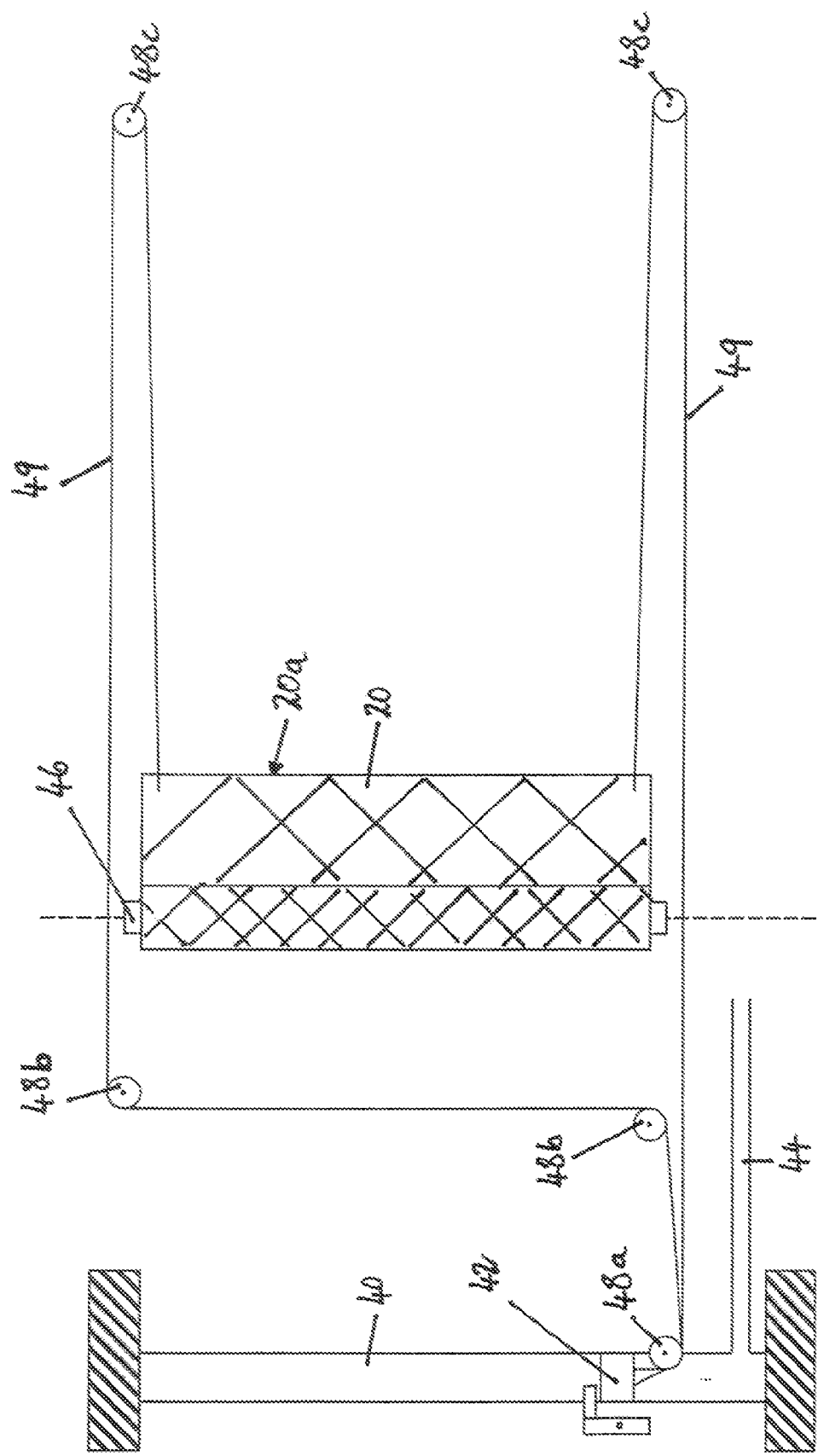
FIG. 11 is a fourth embodiment of the invention in a schematic illustration.

FIG. 11 depicts a fourth embodiment of the invention in a schematic drawing. Here the safety net 20 is rolled up on a spindle 46. This spindle extends vertically and is disposed approximately at the height of the backrest of the vehicle seat. From the front edge 20a of the of the safety net 20, two pull ropes 49 extend across front deflection rollers 48c, which are connected to the vehicle interior structure at a front end of the driver's cabin. Rear deflection rollers 48b and first deflection roller 48a are connected to the moving piston 42, which is disposed in cylinder 40.

A pressure pipe 44 is connected to a lower section of the cylinder 40. This pressure pipe 44 is also connected to the compressed-air system of the brake system of the truck. When the engine of the truck is running, an overpressure, which presses the piston 42 upwards, thus prevails in the lower part of the cylinder 40. In the normal operating state, the piston 42 is held by the locking device 25. This locking device 25, as also described above in the second embodiment, is connected to a sensor, an inclination sensor for example, and releases the piston 42 when the lateral inclination of the driver's cabin exceeds a predefined value. In this case, the piston 42 moves upwards and pulls on the pull ropes 49, which pulls on the safety net 20 in turn and unwinds it from the spindle 46, so that the safety net arrives into position next to the driver or next to the passenger, respectively.

The spindle 46 is connected to flat spiral springs whose force counteracts the unwinding of the safety net 20. The flat spiral springs are of course embodied such that they do not prevent the unwinding of the safety net 20 but only become tensioned from the unwinding. The safety net 20 remains taught as long as the compressed-air system is under pressure. The piston 42 is released after the compressed-air system is shut off, and the safety net 20 is automatically again wound up on the spindle 46 because of the prestressed flat spiral springs. The system thus works in a completely reversible manner. This is particularly advantageous when the driver's cabin does not tip over after the release of the locking device and the spreading of the safety net thus likewise only occurred as a precaution. No repair at the workshop is necessary to put the safety device described here back into its normal at-rest position. Instead of providing a separate locking device, it is also possible to connect the sensor to a valve and then impinge the lower section of the cylinder with pressure only when the sensor detects a critical inclination.

Spindle 46 and cylinder 40 of the fourth embodiment described above can be disposed in a rod 22, wherein the rod 22 here comprises a longitudinal slot through which the safety net 20 exits.

As a person skilled in the art will readily appreciate, the above description is meant as an illustration of implementation of the principles of this invention. This description is not intended to limit the scope or application of this invention in that the invention is susceptible to modification, variation and change, without departing from the spirit of the invention, as defined in the following claims.

The invention claimed is:

1. A safety device for a driver's cabin of a vehicle, wherein the driver's cabin has an interior space formed therein and includes at least one driver seat with a first side adjacent a side window and a second side within the interior space opposite the first side, the device comprising:

a safety net disposed within the interior space adjacent to the second side of the driver seat and a rod disposed within the interior space attached to the safety net, the safety net in a state of rest is one of rolled together and folded together and disposed on the rod which is positioned substantially vertical, and wherein the safety net is configured to restrain an occupant of the vehicle in the event of a rollover accident from being thrown about within the interior space.

2. Safety device according to claim 1 further comprising a sensor, wherein the safety net is unfolded in response to a signal from the sensor.

3. Safety device according to claim 2 wherein the sensor generating the signal measures an inclination of the driver's cabin.

4. Safety device according to claim 2 further comprising a sensor device, which senses an unfolding path of the safety net for the presence of obstacles.

5. Safety device according to claim 1, wherein a lower end of the rod is connected to the cabin floor and a top end of the rod is one of indirectly and directly connected to a cabin ceiling.

6. Safety device according to claim 1 further comprising an arm connected to the safety net and is disposed on a lower region of the rod.

7. Safety device according to claim 6, wherein the arm is pivotally connected to the vertically running rod such that the arm is substantially parallel to the rod in the state of rest and substantially horizontally in a protective state.

8. Safety device according to claim 7, wherein during an accident, the arm swings into the substantially horizontal position and unfolds the safety net into an unfolded state.

9. Safety device according to claim 8 further comprising a guide rail including a slide piece proximate the cabin ceiling.

10. Safety device according to claim 1, wherein the rod is configured to carry at least one additional device.

11. Safety device according to claim 10 wherein the additional device includes at least one step.

12. Safety device according to claim 10 wherein the additional device includes a display screen.

13. Safety device according to claim 1, wherein the safety device operates reversibly.

14. A driver's cabin of a vehicle comprising a safety device according to claim 1.

* * * * *

UNITED STATES PATENT AND TRADEMARK OFFICE
CERTIFICATE OF CORRECTION

PATENT NO.         : 7,464,962 B2                                       Page 1 of 1
APPLICATION NO.    : 11/777723
DATED              : December 16, 2008
INVENTOR(S)        : Anders Hakansson et al.

It is certified that error appears in the above-identified patent and that said Letters Patent is hereby corrected as shown below:

On the Title Page

Item (57), delete lines 1-12 under "ABSTRACT" and substitute therefor --A novel safety device for the driver's cabin of a vehicle, wherein the driver's cabin demonstrates at least one driver seat with a first side facing a side window and a second side opposite the first side. The safety device comprises a safety net, which is spread next to the second side of the driver seat. The safety net can be permanently spread next to the driver seat. The safety net may prevent the person sitting on the driver seat from falling to the opposite inner structure of the driver's cabin when the driver's cabin rolls over.--.

Signed and Sealed this

Second Day of June, 2009

JOHN DOLL
*Acting Director of the United States Patent and Trademark Office*